(12) United States Patent
Park et al.

(10) Patent No.: US 8,635,356 B2
(45) Date of Patent: Jan. 21, 2014

(54) METHOD FOR SUPPORTING SCALABLE PROGRESSIVE DOWNLOADING OF VIDEO SIGNAL

(75) Inventors: Seung Wook Park, Sungnam-si (KR); Ji Ho Park, Sungnam-si (KR); Byeong Moon Jeon, Sungnam-si (KR)

(73) Assignee: LG Electronics Inc., Seoul (KR)

( * ) Notice: Subject to any disclaimer, the term of this patent is extended or adjusted under 35 U.S.C. 154(b) by 1339 days.

(21) Appl. No.: 11/288,222

(22) Filed: Nov. 29, 2005

(65) Prior Publication Data

US 2006/0136457 A1    Jun. 22, 2006

Related U.S. Application Data

(60) Provisional application No. 60/631,170, filed on Nov. 29, 2004.

(30) Foreign Application Priority Data

Jun. 15, 2005 (KR) .......................... 10-2005-0051367

(51) Int. Cl.
*G06F 15/16* (2006.01)

(52) U.S. Cl.
USPC ............................ 709/231; 709/226; 370/390

(58) Field of Classification Search
USPC ....................................................... 709/231
See application file for complete search history.

(56) References Cited

U.S. PATENT DOCUMENTS

| | | | | | |
|---|---|---|---|---|---|
| 4,060,849 | A | * | 11/1977 | Bienvenu et al. ................ | 710/38 |
| 5,611,064 | A | * | 3/1997 | Maund et al. ................... | 711/209 |
| 5,684,969 | A | * | 11/1997 | Ishida ............................ | 715/800 |
| 5,717,945 | A | * | 2/1998 | Tamura .......................... | 715/235 |
| 5,822,317 | A | * | 10/1998 | Shibata ..................... | 370/395.62 |
| 5,937,164 | A | * | 8/1999 | Mages et al. ................... | 709/218 |
| 6,263,371 | B1 | * | 7/2001 | Geagan et al. ................. | 709/231 |
| 6,310,915 | B1 | * | 10/2001 | Wells et al. ............... | 375/240.03 |
| 7,512,281 | B2 | * | 3/2009 | Kadowaki ..................... | 382/240 |
| 7,742,532 | B2 | * | 6/2010 | Jeon et al. ................ | 375/240.29 |
| 2002/0015513 | A1 | * | 2/2002 | Ando et al. .................... | 382/107 |
| 2002/0055355 | A1 | * | 5/2002 | Ikeda ............................ | 455/419 |
| 2002/0076043 | A1 | * | 6/2002 | Van Der Vleuten et al. ..... | 380/37 |
| 2003/0005139 | A1 | * | 1/2003 | Colville et al. ............... | 709/231 |
| 2003/0035478 | A1 | * | 2/2003 | Taubman .................. | 375/240.11 |
| 2003/0041258 | A1 | * | 2/2003 | Wee et al. ...................... | 713/193 |
| 2003/0070081 | A1 | * | 4/2003 | Wee et al. ...................... | 713/189 |
| 2003/0074667 | A1 | * | 4/2003 | Cheung et al. .................. | 725/95 |
| 2003/0074673 | A1 | * | 4/2003 | Nomura et al. ............... | 725/114 |
| 2003/0088877 | A1 | * | 5/2003 | Loveman et al. ............... | 725/92 |
| 2003/0093543 | A1 | * | 5/2003 | Cheung et al. ................ | 709/231 |
| 2003/0110236 | A1 | * | 6/2003 | Yang et al. ..................... | 709/219 |
| 2003/0172131 | A1 | * | 9/2003 | Ao ................................ | 709/219 |

(Continued)

*Primary Examiner* — Hamza Algibhah

(74) *Attorney, Agent, or Firm* — Harness, Dickey & Pierce, P.L.C.

(57) ABSTRACT

Disclosed is a method for enabling scalable progressive downloading of video signals. In the method, when a server transmits scalably encoded content data to a client, the server transmits some of the content data from a head of the content data to a tail of the content data according to transmission conditions, and transmits some of residual data of the content data having not been transmitted in the prior process. When scalably coded transmission content data is reproduced, the transmission content data are stored in a storage means as a file, the content data is read, decoded and output. Further, the recorded content data are read while an area having no recorded content data is skipped based on a specific code in the file.

5 Claims, 7 Drawing Sheets

(56) References Cited

U.S. PATENT DOCUMENTS

| | | | |
|---|---|---|---|
| 2003/0195946 A1* | 10/2003 | Yang | 709/219 |
| 2004/0017850 A1* | 1/2004 | Kim et al. | 375/240.01 |
| 2004/0031054 A1* | 2/2004 | Dankworth et al. | 725/86 |
| 2004/0131115 A1* | 7/2004 | Burgess et al. | 375/240.01 |
| 2004/0139212 A1* | 7/2004 | Mukherjee et al. | 709/230 |
| 2005/0058199 A1* | 3/2005 | Zhao et al. | 375/240.03 |
| 2005/0084132 A1* | 4/2005 | Wee et al. | 382/100 |
| 2005/0089091 A1* | 4/2005 | Kim et al. | 375/240.01 |
| 2005/0100229 A1* | 5/2005 | Becker et al. | 382/232 |
| 2005/0117641 A1* | 6/2005 | Xu et al. | 375/240.08 |
| 2005/0216947 A1* | 9/2005 | Corbin | 725/116 |
| 2006/0013302 A1* | 1/2006 | Bao et al. | 375/240.08 |
| 2006/0031558 A1* | 2/2006 | Ortega et al. | 709/232 |
| 2006/0092938 A1* | 5/2006 | Gentrix | 370/390 |
| 2006/0168227 A1* | 7/2006 | Levine et al. | 709/226 |
| 2006/0168351 A1* | 7/2006 | Ng et al. | 709/248 |
| 2007/0100967 A1* | 5/2007 | Smith et al. | 709/219 |
| 2009/0043906 A1* | 2/2009 | Hurst et al. | 709/231 |
| 2010/0205049 A1* | 8/2010 | Long et al. | 705/14.5 |
| 2010/0223392 A1* | 9/2010 | Pond et al. | 709/231 |

* cited by examiner

METHOD FOR SUPPORTING SCALABLE PROGRESSIVE DOWNLOADING OF VIDEO SIGNAL

DOMESTIC PRIORITY INFORMATION

This application claims priority under 35 U.S.C. §119 on U.S. provisional application 60/631,170, filed Nov. 29, 2004; the entire contents of which are hereby incorporated by reference.

FOREIGN PRIORITY INFORMATION

This application claims priority from Korean Patent Application No. 10-2005-0051367, filed on Jun. 15, 2005; the entire contents of which are hereby incorporated by reference.

BACKGROUND OF THE INVENTION

1. Field of the Invention

The present invention relates to a method for enabling scalable progressive downloading of video signals.

2. Description of the Prior Art

As AV content is digitized, the digitized content may be recorded in a recording medium such as a disk and transferred to users. In addition, with the development of networks, the digitized content may be stored in a server. Therefore, users can receive the content through networks and reproduce the received content through their terminals, e.g., PCs, thereby viewing the content.

A method for receiving and reproducing the content data through networks as described above includes a streaming scheme and a download scheme. In the streaming scheme, content data are received and simultaneously decoded, so that the decoded data are presented to users. In the download scheme, all of the content data are received and stored as a file and data of the stored file are sequentially read for decoding.

The streaming scheme is advantageous in that it can present the content data directly without long waiting time (but buffering time for some data is required). However, the streaming scheme is disadvantageous in that the content data cannot be moved or copied to other media because the content data are not stored as a file, and users must receive the content data again through networks when the users want to view the content data again. Differently from the streaming scheme, the download scheme is advantageous in that the content data can be moved or copied to other media because the content data are stored as a file. However, the download scheme is disadvantageous in that more time is required because presentation of the content data is performed after all the content data have been received.

A progressive downloading scheme is a scheme for overcoming disadvantages of the two schemes as described above. According to the progressive downloading scheme, data in the previously recorded file are read, decoded and outputted while currently downloaded content data are stored as a file. Further, some of the data are stored as a file and directly decoded without waiting time, and the file data can be repeatedly viewed after the initial viewing because the received data are stored as the file. In addition, the data may be copied or moved to other media.

However, because content data stored in and provided from a server must be provided with Quality of Service (QoS) according to network load or capability of a terminal, it is preferred to encode the content data by a scalable video or audio codec scheme. For example, according to a Scalable Video Codec (SVC) scheme, video signals are encoded with the best quality, but videos with low quality can be expressed even when a partial sequence (a sequence of a frame intermittently selected from the whole sequence) of a picture sequence created through the encoding is decoded for use.

Accordingly, a content server stores a content data file obtained by encoding video signals with the best quality, and transmits a picture sequence suitable for current conditions, i.e., a current bandwidth of a network, rendering capability of a terminal, etc., from the file, thereby causing the picture sequence to be decoded. That is, the data (scalable data) encoded by the scalable scheme may also be transmitted while some data in the file are skipped during transmission according to the current transmission states.

According to the progressive downloading scheme as described above, received data are stored as a file, i.e., meta data (representing subsidiary information of the file, a timing index, etc) of a content file initially transmitted from a server are stored at a corresponding position of the file, and then the content data are stored. However, if the content data are partially received due to the scalable characteristics, the content data do not correspond to the information of the meta data recorded in the specific position of the file. That is, a loss block having no content data occurs at a position designated by the meta data. Therefore, when the stored file is read and reproduced again depending on the meta data, there is an attempt to decode the data loss block, which may cause unexpected errors.

SUMMARY OF THE INVENTION

Accordingly, the present invention has been made to solve the above-mentioned problems occurring in the prior art, and it is an object of the present invention to provide a method in which, when scalably encoded content data are decoded by a progressive downloading scheme and simultaneously stored in a file, a decoding problem does not occur in the subsequent reproduction of the file even though the content data are partially stored in the file.

It is another object of the present invention to provide a method for decoding data of a corresponding file in order to prevent a decoding problem from occurring when scalably encoded content data are partially stored in the file by a progressive downloading scheme.

It is further another object of the present invention to provide a method for progressively downloading scalably encoded content data in consideration of current data transmission environments so that the downloaded data can be reproduced with high quality.

In order to achieve the above objects, according to one aspect of the present invention, when a server transmits scalably encoded content data to a client, the server transmits some of the content data from a head of the content data to a tail of the content data according to transmission conditions, and transmits some of residual data of the content data having not been transmitted in the prior process.

In order to achieve the above objects, according to another aspect of the present invention, when scalably coded transmission content data is reproduced, the transmission content data are stored in a storage means as a file, the content data is read, decoded and output, and the recorded content data are read while an area having no recorded content data is skipped based on a specific code in the file.

According to one embodiment of the present invention, data of a picture sequence selected from content data are partially provided to a client according to a transmission rate of a transmission channel.

According to one embodiment of the present invention, a server transmits content data including a specific code.

According to another embodiment of the present invention, a server provides identification information indicating that a specific code must be recorded, and a client storing received content data as a file records the specific code at a corresponding position in the file based on the identification information.

According to one embodiment of the present invention, when data in a file including recorded content data are read, portions from a portion having a recorded specific code to a portion before a data block starting without the specific code are skipped.

According to another embodiment of the present invention, when data in a file including recorded content data are read, portions from a portion having a recorded specific code to a portion before a data block starting with another specific code having a value different from the specific code are skipped.

According to one embodiment of the present invention, in a file including recorded content data, the size of the file is reduced by filling an area having no content data with content data recorded after the area.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Hereinafter, a preferred embodiment of the present invention will be described with reference to the accompanying drawings.

Figure 1:
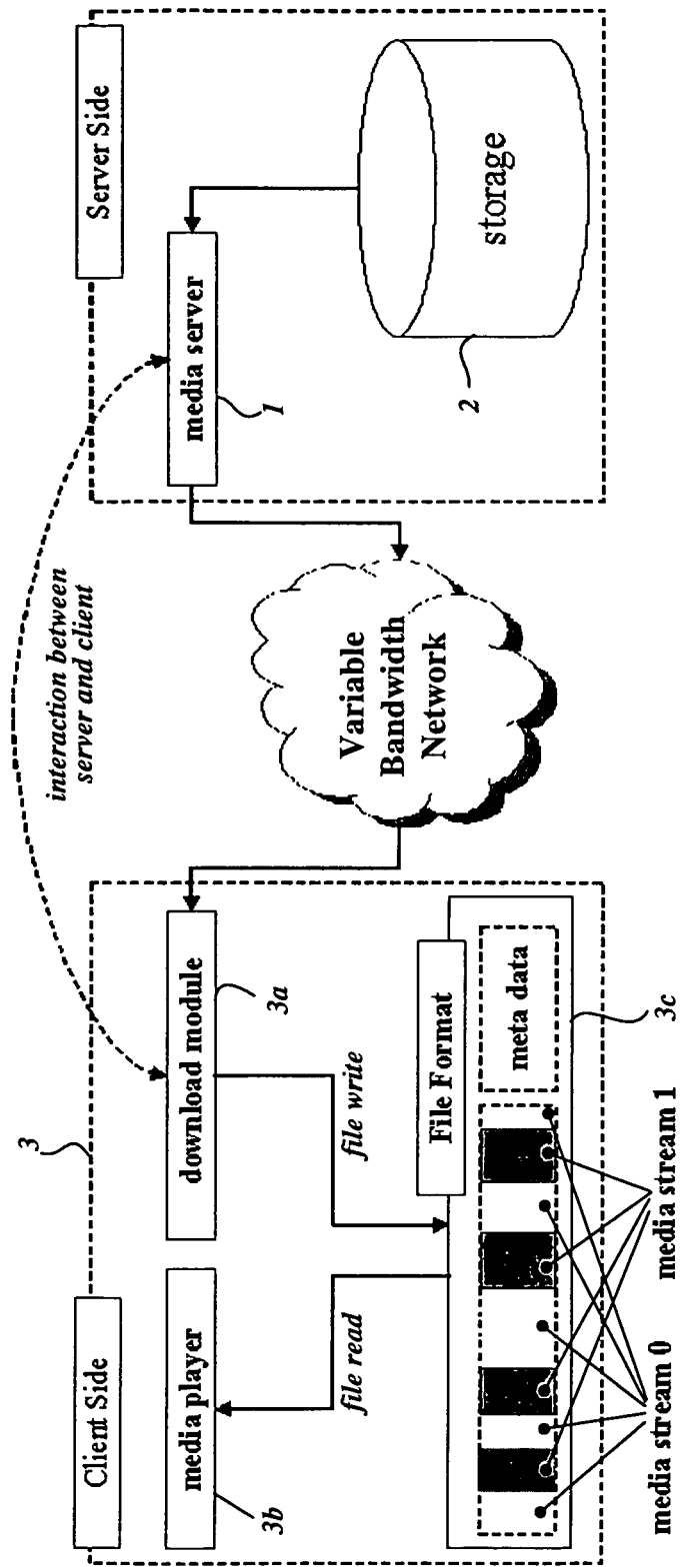
FIG. 1 is a block diagram illustrating the construction of a network apparatus to which a progressive downloading method is applied according to one embodiment of the present invention.

FIG. 1 is a block diagram illustrating the construction of a network apparatus to which a progressive downloading method is applied according to one embodiment of the present invention.

Figure 2:
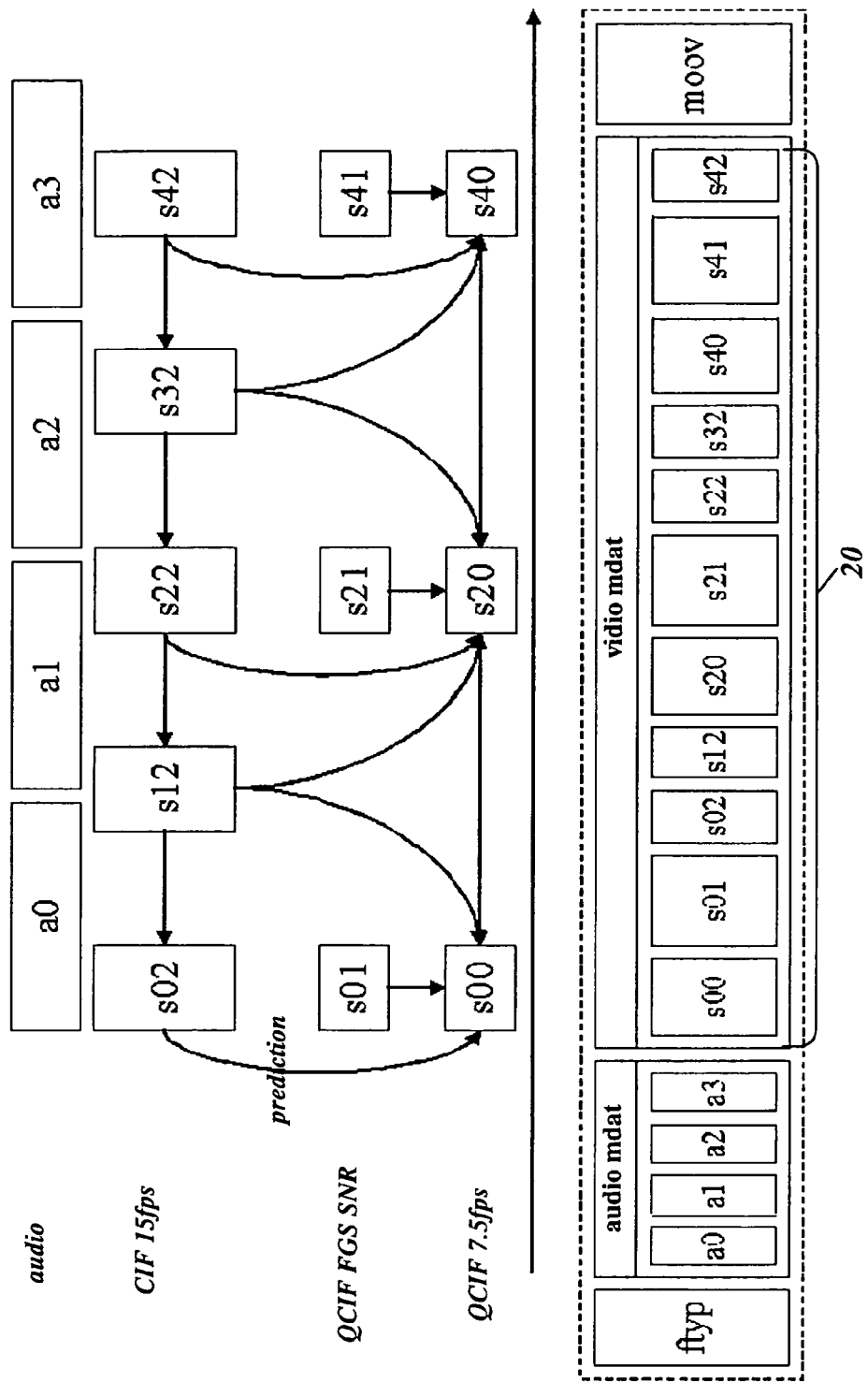
FIG. 2 is a diagram illustrating example of a format of a scalable content data file to be downloaded according to the present invention.

As shown in FIG. 1, the storage 2 stores many scalably encoded content data files. FIG. 2 shows an example of one of the content data files stored in the storage 2. In the file, information "ftyp" for file types, non-scalably coded audio data blocks a0 to a3, video data blocks 20, and meta data "moov" are sequentially disposed. The video data blocks 20 are generally disposed in a sequence of presentation time. In the same time zone, the video data blocks 20 are disposed in a sequence of a lower sequence, e.g., blocks of an SNR base layer in a Quarter Common Intermediate Format (hereinafter, referred to as QCIF) sequence, blocks of an SNR enhancement layer in the lower sequence, and an upper sequence, e.g., blocks of a CIF sequence. The CIF sequence has been coded employing a picture of the QCIF sequence as a prediction image.

When a request for the file stored as shown in FIG. 2 is received from the client 3, the media server 1 of FIG. 1 reads the file from the storage 2 and transmits the read file. Herein, the media server 1 first transmits the information "ftyp" for file types and the meta data "moov". Before the transmission, the media server 1 transmits/receives information to/from the client 3, thereby determining a proper transmission rate and parts to be transmitted according to the transmission rate. For example, when the determined transmission rate may cover all of the SNR base and enhancement layers of the QCIF, the media server 1 transmits the blocks of s00, s01, s20, s21, s40 and s41 in the simplified example of FIG. 2.

When the information "ftyp" for file types and the meta data "moov" are received, the download module 3a in the client 3 creates a file based on the received information and records the received data in corresponding positions of the file.

After transmitting the information "ftyp" for file types and the meta data "moov", the media server 1 transmits content data. That is, the media server 1 transmits the non-scalably coded audio data blocks a0 to a3 and scalably coded video data blocks according to a presentation order of each block. In transmission of the video data, there is an attempt to transmit only a data block corresponding to the picture sequence previously determined by mutual information exchange. That is, when it has been determined to transmit up to the block of the SNR enhancement layer in the QCIF, there is an attempt to transmit only the blocks of s00, s01, s20, s21, s40 and s41 in the example of FIG. 2.

When a channel bandwidth is far lower than an initially determined transmission rate due to deterioration of characteristics of a network transmission channel while the video data are transmitted, the media server 1 does not transmit a portion less affecting the picture quality, i.e., skips the portion, even when the data are lost in order to reduce the amount of transmitted data by the reduction of the transmission rate. For example, if the data of the blocks s01, s21 and s41 of the SNR enhancement layer in the QCIF sequence can be truncated (when FGS or bit-plane coding is used), only a front portion of each block is truncated and transmitted. However, if the data have been encoded so that it cannot be truncated in random positions, the media server 1 skips transmission of all of the corresponding data blocks. The current transmission rate of a transmission channel may be understood by transmitting a value obtained by dividing the amount of actually received data by time from the download module 3a to the media server 1.

Figure 3:
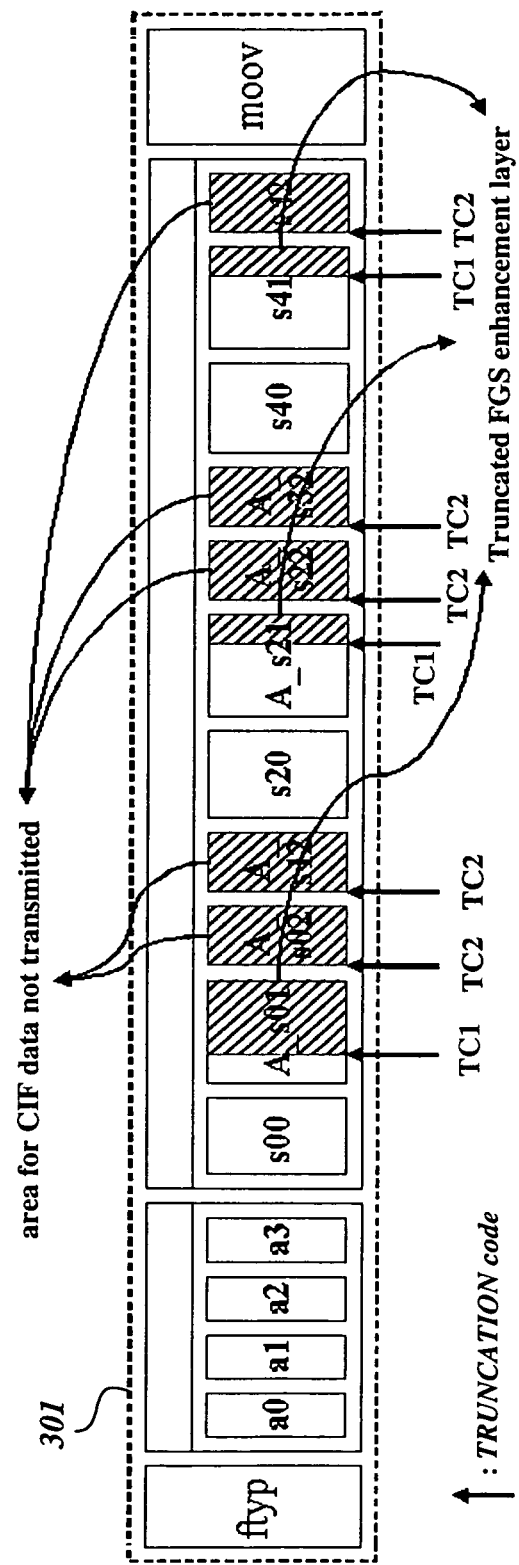
FIG. 3 is a diagram illustrating one example of a format of a file downloaded and stored according to the present invention.

After all of the whole picture sequence of the content data selected by the afore-described process is completely transmitted, one file is completed in the storage means 3c, e.g., a hard disk, of the client 3. FIG. 3 shows an example of a format of the file created according to the transmission process as described above. In the example of FIG. 3, the QCIF sequence is selected, so that content data do not exist in corresponding areas A_s02, A_s12, A_s22, A_s32 and A_s42 of the data block corresponding to the CIF sequence, and only some of the content data (white portions) are recorded in corresponding areas A_s01, A_s21 and A_s41 of the data block belonging to the SNR enhancement layer in the QCIF sequence.

In the created file 301, a Truncation Code (hereinafter, referred to as TC) 1 is recorded just behind the data in a block on which the block data are partially recorded instead of being recorded throughout the block. Even when all of the block data have not been transmitted, a TC2 may be recorded in front of a corresponding recording area. A TC is defined so that it is not confused with another syntax within a media bit stream. Particularly, the TC has a value different from that of a start code inserted in front of a data block.

In one embodiment in which the TC is recorded, when the media server 1 does not transmit all of the corresponding data block but transmits some of the corresponding data block, a TC is added to behind of the data for transmission. In this case, the download module 3a in the client 3 has only to record some data of the received data block in an area indicated by position information in the file of the data. The media server 1 transmits the block data through transmission segments and each of the transmission segments includes data, position information in the file of the data, subsidiary information for the data, e.g., data types, a 'truncation flag' which will be described later, etc.

In another embodiment in which the TC is recorded, when the media server 1 does not transmit all of the corresponding data block but transmits some of the corresponding data block, the media server 1 sets a 'truncation flag' to a predetermined value, e.g., 1, in the subsidiary information of transmission segments including the last portion of the block data. When the 'truncation flag' has been set in the subsidiary information of the received transmission segments, the download module 3a records the data and then records a TC just behind the data.

When all of the block data have not been transmitted, according to one embodiment in which the TC2 is recorded in front of the corresponding area, the media server 1 transmits only the TC instead of data of a corresponding block, or sets a 'truncation flag' in the subsidiary information of transmission segments and sets the data size to 0 for transmission.

When all of the block data have not been transmitted, according to one embodiment in which the TC2 is not recorded in front of the corresponding area, a media player 3b (or a media decoder) determines that valid content data have been recorded in the recorded file 301 by detecting a 'start code' recorded in front of each block.

That is, when the 'TC' is recorded in front of the area corresponding to the data block to which all of the block data have not been transmitted, the media player 3b skips (i.e., ignores) the block up to the portion just before the block having no 'TC', thereby reproducing only valid data intervals. However, when the 'TC', is not recorded in front of the area corresponding to the data block to which all of the block data have not been transmitted, the media player 3b skips (i.e., ignores) the block up to the portion just before the block having a 'start code', thereby reproducing only valid data intervals.

In a case in which the media player (media decoder) 3b reads the TC during decoding, when the data block is a block, e.g., a FGS slice in an SVC, which may be truncated at random positions, the media player 3b recognizes that the data ends at a position at which the TC has appeared and continues the decoding.

While the download module 3a records the received data block in the created file 301, the media player 3b sequentially reads the data block from the head, decodes the read data, and outputs the decoded data on a screen. When the media player 3b meets the TC during the sequential reading of the data block, the media player 3b skips an area having no recorded data according to the afore-described method, reads valid data portions, decodes the read data, and outputs the decoded data. Accordingly, downloading of the content data can be performed with the decoding output at the same time.

Figure 4:
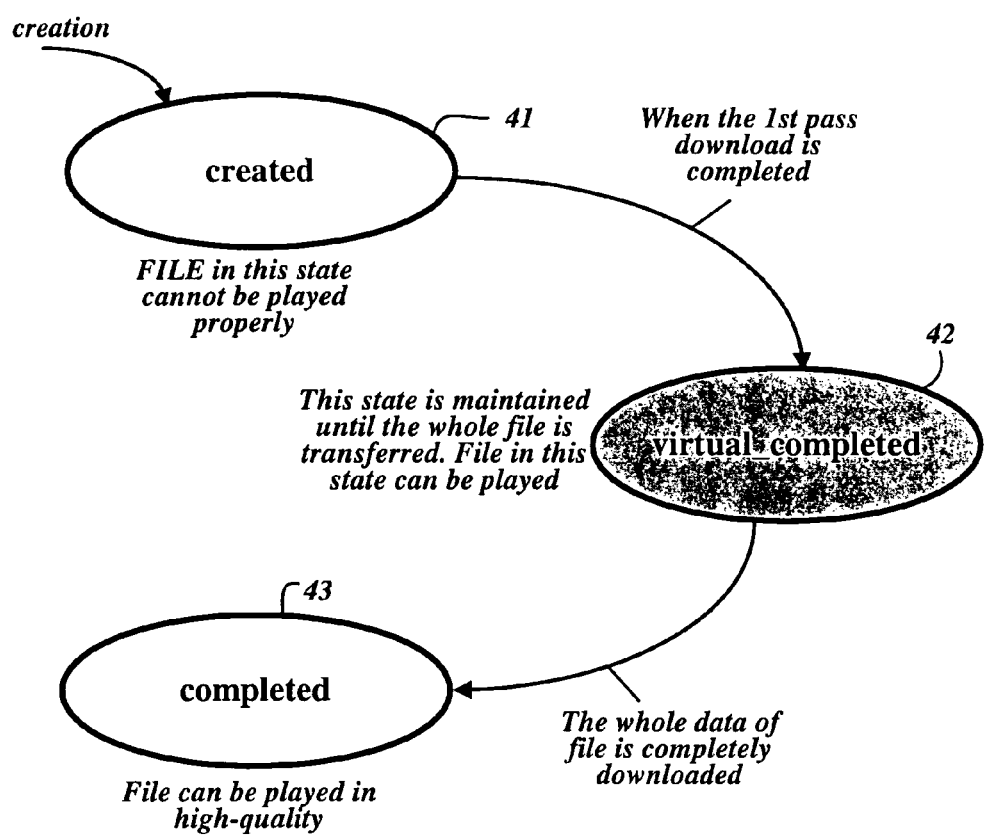
FIG. 4 is a diagram illustrating state change in a file recording content data downloaded by a progressive scheme according to the present invention.

While the download module 3a creates the file and receives the data, the download module 3a updates the status of the file. FIG. 4 is a diagram illustrating change in the file statue. The statue may be recorded in the subsidiary information of the file, e.g., the meta data "moov".

After the download module 3a creates an initial file, the download module 3a designates the status of the file as a 'created' state 41. When the block data belonging to the selected sequence are transmitted to the end and recorded with some missing block data according to variation of a channel bandwidth, the download module 3a designates this status as a 'virtual_completed' state 42. The file in this state may be moved or copied to another medium, and it is also possible to present the moved or copied file through a player having a decoder capable of recognizing the 'TC'. The download module 3a transmits an additional download request for the file in the 'virtual_completed' state to the media server 1, thereby receiving the file. That is, the download module 3a transmits a download request for all data (encoding data for the best quality) of the selected file to the media server 1. If the media server 1 has known information previously provided for corresponding content data, the media server 1 provides the download module 3a with data of remaining portions having not been provided, e.g., non-transmission intervals of the SNR enhancement layer block of the QCIF sequence and blocks of the CIF sequence in FIG. 3. Otherwise, the download module 3a provides the media server 1 with information for the currently downloaded data, thereby requesting downloading for the data of the portions having not been provided.

After the primary download is completed, a download request and reception for the content data, i.e., residual data, having not been provided may also be performed while the media player 3b reproduces the file data in the 'virtual_completed' state, or may be performed at a random time point after the reproduction is completed. Further, additional content data may be received and recorded when there left some extra available transmission channels according to the channel bandwidth, the decoding capability of the media player 3b, etc., in addition to the content data having been reproduced and output after the primary download. This is because content data of a corresponding file may be reproduced by a player having superior decoding capability through a different medium. If all data in the file are received through the additional downloading, the download module 3a updates the status of the corresponding file to a 'completed' state 43.

FIG. 4 shows that predetermined content data have been completely downloaded over twice. However, the content data may be completely downloaded over more than three times. In this embodiment, the level of a 'virtual_completed' state is designated, so that download for predetermined content data corresponding to the next step is requested based on the level when there left some extra available transmission channels, thereby receiving the corresponding data. If all data are received in the file through several times of downloads, i.e., a multi-path process, the download module 3a updates the status of the corresponding file to the 'completed' state 43.

After the primary download, the content data may also exist in the 'virtual_completed' state, or in the 'virtual_completed' state in which the file is not filled with all data even though one or more additional downloads has passed after the primary download.

Figure 5:
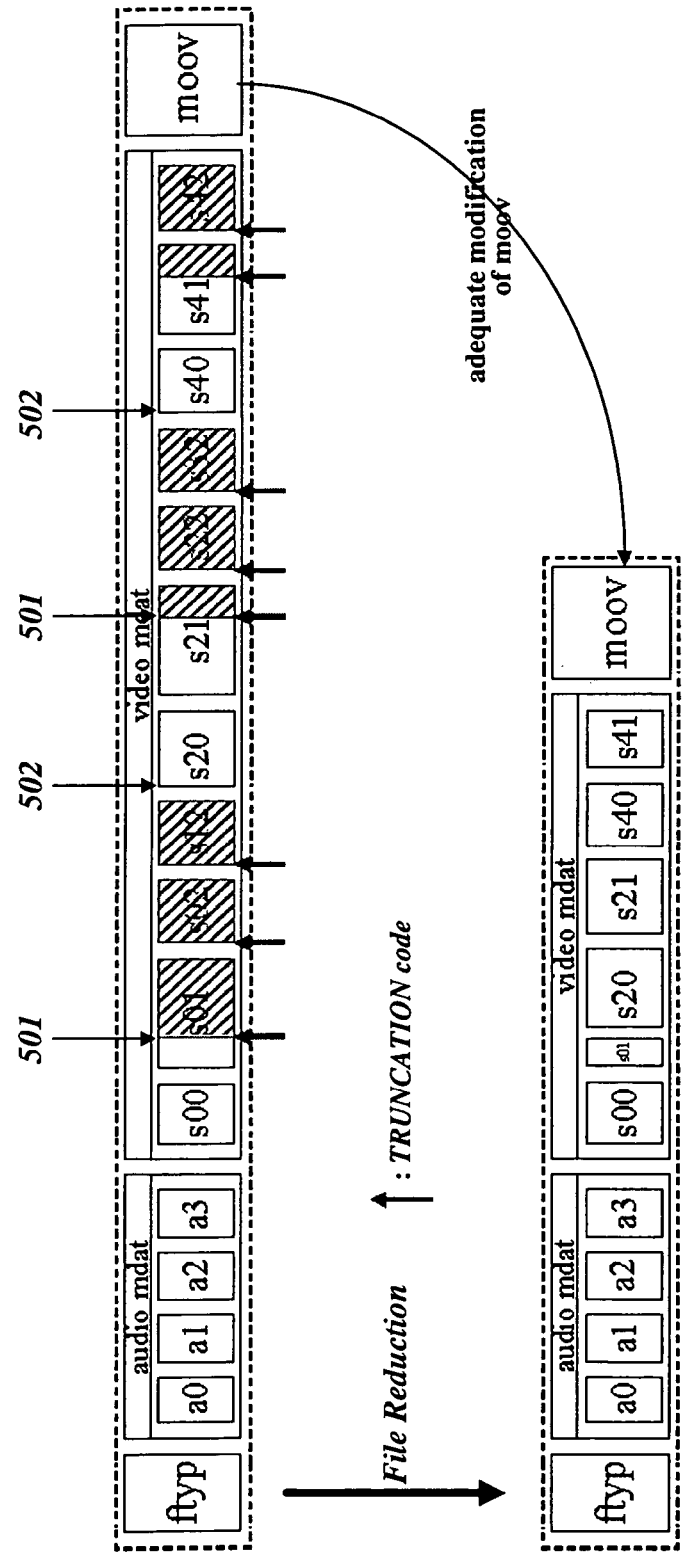
FIG. 5 is a diagram illustrating a scheme for reducing a file in which all data are not downloaded according to the present invention.

When an additional download for the content data having not been provided is unnecessary after the primary download is completed, a user may execute a separate application provided in the client 3, thereby reducing the size of the file in the 'virtual_completed' state. FIG. 5 shows an example in which the size of the file is reduced. Referring to FIG. 5, in order to reduce the size of the file, the received content data blocks are moved to areas (hatched by slant lines) having no recorded content data. A method for finding out the areas having no recorded content data is the same as that by which the media player 3b finds out areas to be skipped based on the TC (and the start code) as described above. That is, if a TC 501 appears, the media player 3b removes areas before a data block 502 starting without a TC. Otherwise, if a TC appears, the media player 3b removes areas before a data block starting with the next start code. Then, valid content data after the areas are moved to positions of the areas, so that the size of the file is reduced. Herein, since position information changes due to the movement of the data blocks, meta data information is also updated according to the change in the position information. In addition, the status of the file is also updated to the 'completed' state from the 'virtual_completed' state.

Figure 6:
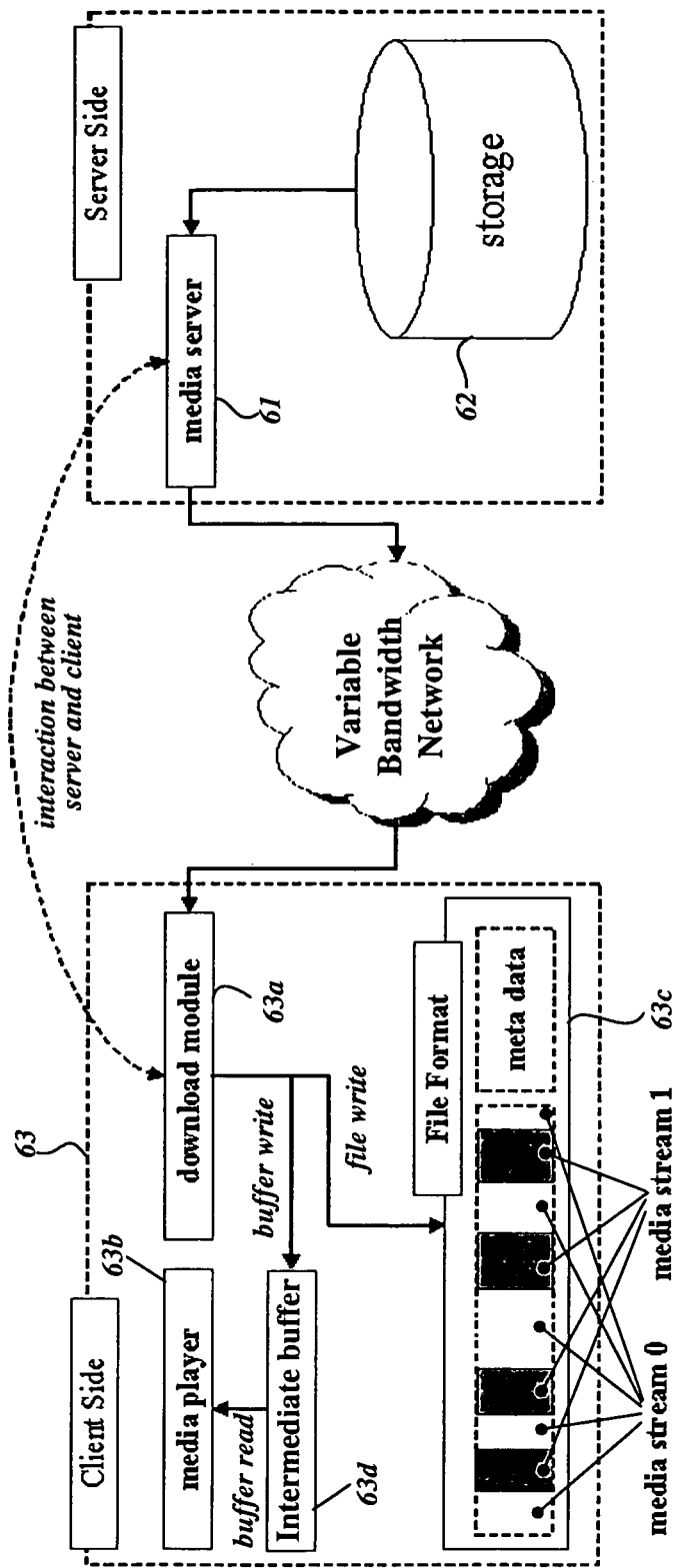
FIGS. 6 and 7 are block diagrams illustrating the constructions of network apparatuses to which a progressive downloading method is applied according to other embodiments of the present invention.

FIG. 6 is a block diagram illustrating the construction of a network apparatus to which a progressive downloading method is applied according to another embodiment of the present invention.

As shown in FIG. 6, content data transmitted from a media server 61 are stored in a storage means 63c by a download module 63a and are simultaneously buffered by an intermediate buffer 63d. Accordingly, a media player 63b sequentially reads the content data buffered by the intermediate buffer 63d and decodes the read content data for output, instead of reading content data from a recorded file. Since the content data buffered by the intermediate buffer 63d are recorded without empty spaces and the media player 63b uses the data of the intermediate buffer 63d, the media server 61 does not need to provide a client 63 with the 'TC' or information for record of the 'TC' in the afore-described embodiment.

When the file recorded by the download module 63a does not include all data, i.e., when the file is in the 'virtual_completed' state in the afore-described embodiment, presentation errors may occur due to garbage data in areas having no recorded content data when decoding is performed. Consequently, it is preferred that the download module 63a receives all data from the media server 61 through a transmission request when there left some extra available transmission channels, thereby updating the status of the file to a 'completed' state.

Figure 7:
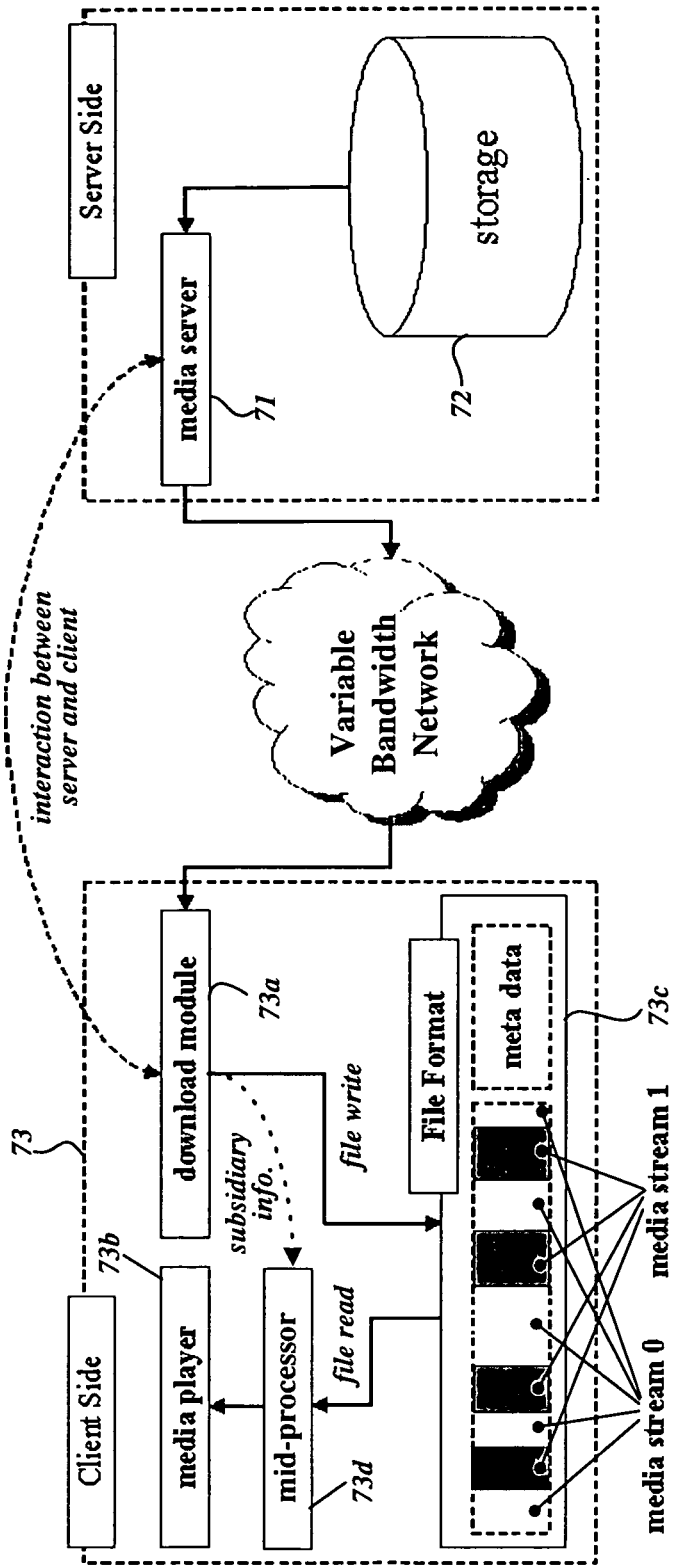

FIG. 7 is a block diagram illustrating the construction of a network apparatus to which a progressive downloading method is applied according to further another embodiment of the present invention.

As shown in FIG. 7, content data and subsidiary information transmitted from a media server 71 are stored in a storage means 73c by a download module 73a and are simultaneously applied to a mid-processor 73d. The mid-processor 73d analyzes only the subsidiary information of the content data from the applied content data, understands predetermined portions of the content data in which predetermined blocks of the content data are recorded, read corresponding data from the portions, and provides the read corresponding data to a media player 73b. Accordingly, the media player 73b sequentially decodes the content data provided from the mid-processor 73d, thereby storing the decoded content data in a file and simultaneously presenting the decoded content data. Since the mid-processor 73d understands positions of block data non-continuously recorded in the content data from subsidiary information in received transmission segments, the media player 73b does not need to record information such as a 'TC' in the file. Accordingly, in the present embodiment, the media server 71 does not need to provide a client 73 with the 'TC' or information for record of the 'TC' in the afore-described embodiment.

When the file recorded by the download module 73a does not include all data, i.e., when the file is in the 'virtual_completed' state in the afore-described embodiment, presentation errors may occur due to garbage data in areas having no recorded content data when decoding is performed. Consequently, it is preferred that the download module 73a receives all data from the media server 71 through a transmission request when there left some extra available transmission channels, thereby updating the status of the file to a 'completed' state.

According to the present invention as described above, a progressive downloading method is applied to scalable video or audio data, so that users can view scalably encoded content data provided from a server without waiting time and can repeatedly enjoy stored content data with more higher quality.

The preferred embodiment of the present invention has been described for illustrative purposes, and those skilled in the art will appreciate that various modifications, additions and substitutions are possible, without departing from the scope and spirit of the invention as disclosed in the accompanying claims.

What is claimed is:

1. A method for reproducing content data for a picture sequence including a base layer data and an enhancement layer data in a client, comprising:

first obtaining, by the client, first coded data having subsidiary information and being a partial portion of the content data, the first coded data being obtained according to first transmission conditions, the partial portion corresponding to the base layer data;

recording, by the client, the first coded data in a file;

recording, by the client, a truncation code in the file based on the subsidiary information, the subsidiary information including information indicating the first coded data includes a portion of the content data for the enhancement layer data; and reproducing, by the client, the first coded data in the file based on the truncation code, wherein the content data includes a plurality of data blocks, if data in a data block is partially obtained during the first obtaining, the truncation code indicates an end position of the data in the data block, and if all data in a data block is not obtained during the first obtaining, the truncation code indicates a start position of the data block.

2. The method of claim 1, further comprising:

second obtaining, by the client, second coded data for the content if the first transmission conditions are changed to second transmission conditions by exchanging information between a server and the client, the second coded data being transmitted according to the second transmission conditions and including a residual portion of the content data, wherein the first transmission conditions and the second transmission conditions are determined by exchanging information between the server and the client, and the exchanged information includes a current bandwidth of a network and rendering capability of the client; and recording, by the client, the second coded data in the file, the recorded file includes the first coded data and the second data, and the recorded file corresponds to the enhancement layer data.

3. The method of claim 2, wherein the first transmission conditions and the second transmission conditions include at least one of a type of a sequence and an available transmission rate of a transmission channel, and the first transmission conditions and the second transmission conditions have different types of the sequence or the available transmission rates of the transmission channel.

4. The method of claim 1, wherein a status of the file having the first coded data is distinguished from a status of a file having recorded all of the picture sequence.

5. The method of claim 2, wherein a status of the file in which the first coded data is completely downloaded is designated as a virtual completed status, and a file in which the first coded data and the second coded data are completely downloaded is designated as a completed status.

* * * * *